UNITED STATES PATENT OFFICE.

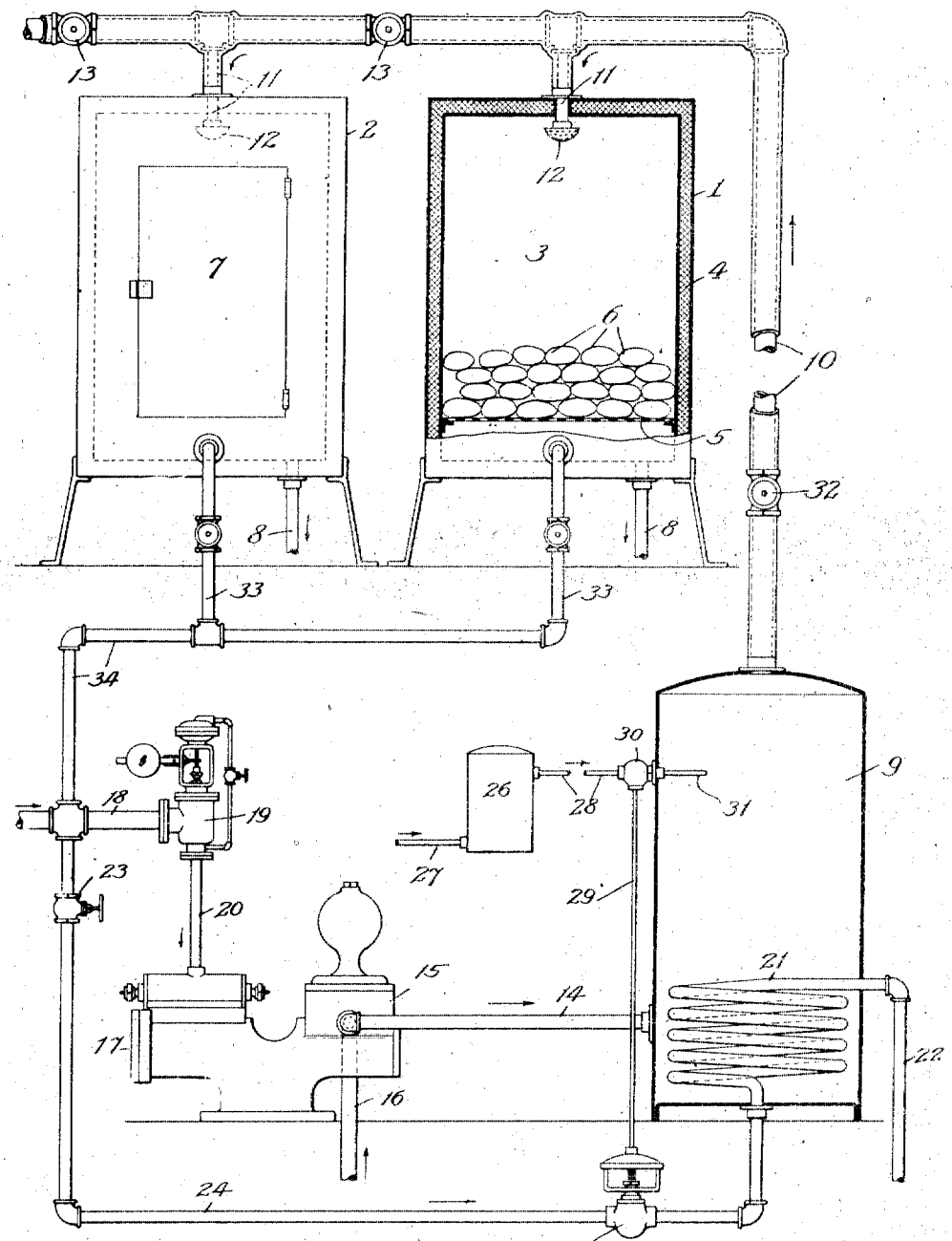

CHARLES B. TRESCOTT, OF CHICAGO, ILLINOIS, ASSIGNOR TO MORRIS & COMPANY, OF CHICAGO, ILLINOIS, A CORPORATION OF MAINE.

LOW-TEMPERATURE COOKING APPARATUS.

1,214,393.     Specification of Letters Patent.     Patented Jan. 30, 1917.

Application filed June 22, 1916. Serial No. 105,317.

*To all whom it may concern:*

Be it known that I, CHARLES B. TRESCOTT, a citizen of the United States, residing at Chicago, in the county of Cook and State of Illinois, have invented a new and useful Improvement in Low-Temperature Cooking Apparatus, of which the following is a specification.

The primary object of my invention is to provide a construction of cooking apparatus best adapted for the practice of a process for low-temperature cooking described in my co-pending application for Letters Patent, Serial No. 105,316, filed June 22, 1916, and involving the spraying of hot water into a chamber containing the material to be cooked to heat the air in the chamber to the temperature for the low-temperature cooking purpose and saturate that air with water to serve as a vehicle for carrying the heat-units uniformly to the matter undergoing cooking.

The accompanying drawing illustrates the cooking apparatus in a preferred form of embodiment of my invention, by a view in elevation partly sectional and diagrammatic in character.

A series of two similar cookers, 1 and 2, is shown in the drawing, though the number may be only one or more than two, as hereinafter more fully explained. The cooker illustrated is a double-walled sheet-iron chamber 3, on legs, and has the space between the walls filled with insulating material 4. A perforate metal shelf 5 is provided in the lower part of the chamber for supporting the matter to be cooked, such as hams, indicated at 6; and the chamber has a hinged door 7 and a depending open discharge-spout 8 for leading off surplus water, as to a sewer. A tank or holder 9 for water to be heated in its passage therethrough and sprayed into the cooking-chamber, has a pipe-connection 10 at its upper end with the top of the chamber 1 at its center, through the medium of a depending branch 11 terminating in a spraying head 12 inside the chamber. Where two or more of the cookers are used in series, as indicated, the pipe 10 forms a header, from which a branch 11, terminating in a spraying head 12, extends into each chamber, as shown and described of the cooker 1; and shut-off valves, indicated at 13, should then be provided in the header between the successive cookers.

For feeding the tank continuously with water to be heated in its course therethrough, the tank communicates from near its lower end through a pipe 14, with a force-pump, which takes cold or relatively cool water through a pipe 16 from a suitable source of supply (not shown). The pump 15 is driven by a steam-engine 17 of any suitable type, which is supplied with live steam from a high-pressure source (not shown) through a conduit 18 leading to a pressure-reducing valve 19 having a pipe-connection 20 with the engine for actuating the latter by the reduced pressure for driving the water-pump. For the present purpose, the pressure at which water is pumped into the holder 9 need not exceed about 35 lbs., and by reducing the steam-pressure from the supply-source, through the medium of the valve-device 19, to about 40 lbs., for operating the engine 17, the pump will introduce the water into the tank at a pressure of about 35 lbs., as above suggested, the loss being due principally to friction. Under this pressure, the water discharges from the tank through each spraying-head 12 into the upper end of the respective cooker-chamber, and is sprayed into the initially cold atmosphere therein to saturate it. This air must be heated to the predetermined cooking temperature of about 140° to 145° F. for cooking hams (or about 180° F. for cooking vegetables), and to that end the water is heated in the tank through the medium of a steam-coil 21 contained therein, shown to discharge through a pipe 22, as to a sewer, and to receive its supply of steam through a pipe 24 leading into it, from the main steam-supply conduit 18, through the tank-bottom, and containing a shut-off valve, indicated at 23. For automatically controlling the temperature of the water in the tank 9, to maintain desirable uniformity thereof for the cooking purpose, the pipe 24 is equipped with an ordinary diaphragm-operated valve-device, indicated at 25, to be controlled by compressed air from a holder 26 communicating through a pipe 27 with a source of air-pressure supply (not shown), and discharging through a pipe 28 into a pipe 29 leading into the diaphragm-chamber of the valve-device 25; communication of the pipes 28 and 29 with each other being controlled by a needle-valve device, indicated at 30, operated by a thermostat, indicated at 31, in the upper part of the tank.

In the employment of the apparatus thus described for cooking hams by the low-temperature cooking process hereinbefore referred to, the hams 6 are introduced into the cooker through its opened door 7 and piled on the shelf 5. With the water under pressure in the tank 9 and heated to the required temperature by the steam-heated coil 21,—say to about 150° F.—upon opening a valve 32 in the pipe 10 the hot water will be showered in a fine spray into the cooker 1, supposing that to be the only cooker in use. The temperature for the low-temperature cooking of hams of about 140° to 145° F. is that at which the water, at 150° F. in the tank, will enter the cooker; though the pipe 10 and its branches 5 should be insulated to prevent undue cooling of the water in its course to the cooker-chamber. The hot water which is continuously sprayed into the upper end of that chamber, saturates the air therein, heating it to the degree required for the low-temperature cooking and affording a vehicle for carrying the heat-units to and causing them to act uniformly on the meat. The surplus hot water discharges through the outlet-pipe 8.

If one or more cookers be, as contemplated, provided in addition to the cooker 1, as each is brought into use, the respective valve 13 is opened and kept open until the operation in the added cooker is completed. The meat, such as hams 6, when introduced into a chamber 3, is usually quite cold, and in that condition tends to retard the cooking action therein of the water heated and saturated air. To avoid such retardation, each cooker has leading into its bottom a valved branch 33 of a steam-pipe 34 branching from the steam-supply conduit 18, whereby live steam may be introduced into the cooker-chamber to warm the cold meat and quickly bring the chamber up to the cooking temperature. Furthermore, as each additional cooker is brought into commission, the water from the tank 9 may, unless prevented, discharge faster than it becomes heated to the predetermined temperature for effecting the cooking. The thermostat prevents that, since if the heat of the tank-water lowers below the predetermined degree, it actuates the thermostat to open the valve 25 farther and increase the admission of steam to the coil 21 for quickly raising the temperature of the flowing tank-water to that predetermined. Even with a single cooker in the system, however, the thermostat is useful in automatically shutting off and opening the valve 25, as required, to maintain a uniform temperature of the cooker-atmosphere heating and saturating water.

It is to be understood that the essential features of my improved apparatus are a cooker-chamber and means for continuously introducing water into it in a finely divided condition, as by spraying, to saturate the air contained, at normal pressure, in the chamber; and this whether the water be preliminarily heated to both saturate and heat the air for the low-temperature cooking purpose, or the air be heated independently of the water, as by an extraneous heater, such as is provided in the apparatus shown and described in my allowed application, Serial No. 26,530, filed May 7, 1915.

I realize that considerable variation is possible in the details of construction thus specifically shown and described, and I do not intend by illustrating a single specific or preferred embodiment of my invention to be limited thereto, my intention being in the following claims to claim protection upon all the novelty there may be in my invention as broadly as the state of the art will permit.

What I claim as new and desire to secure by Letters Patent is—

1. A low-temperature cooking apparatus, comprising a cooker, means for introducing continuously, during the cooking operation employing hot air in the cooking-chamber, water in a finely divided condition to saturate therewith the air in said chamber, and means for regulating the supply of said water into said chamber to maintain therein during said operation a predetermined temperature for the cooking below the boiling-point of water.

2. A low temperature cooking apparatus, comprising a cooker, a water-showering pipe leading into the cooker-chamber, a water-heater discharging to said pipe, means for forcing water into and through said heater into the cooker-chamber by way of said pipe continuously during the cooking operation, and means for heating the water in said heater.

3. A low temperature cooking apparatus, comprising a cooker, a water-showering pipe leading into the cooker-chamber, a water-tank discharging through said pipe into said chamber, means for forcing water into and through said tank into the cooker-chamber by way of said pipe, means for heating the water in passing through said tank, and a thermostat-device connected with the tank and controlling the supply of heating medium for the water.

4. A low temperature cooking apparatus, comprising a cooker, a water-showering pipe leading into the cooker-chamber, a water-tank discharging through said pipe into said chamber, a water-forcing pump discharging into said tank to force water therethrough into the cooker-chamber by way of said pipe, a heater in said tank, a valved steam-pipe discharging into the heater for heating the water in passing through said tank, and a thermostat in said tank connected with the steam-pipe valve to control the passage of steam therethrough.

5. A low temperature cooking apparatus, comprising a cooker, a water-showering pipe leading into the cooker-chamber, a water-heater discharging to said pipe, means for forcing water into and through said heater into the cooker-chamber by way of said pipe continuously during the cooking operation, means for heating the water in said heater, and a valved steam-supply pipe leading into the cooker-chamber.

6. A low temperature cooking apparatus comprising a cooker, a water-showering pipe leading into the cooker-chamber, a water-tank discharging through said pipe into said chamber, a water-forcing pump discharging into said tank to force water therethrough into the cooker-chamber by way of said pipe, a heating-coil in said tank, a steam-supply conduit, a reducing-valve to which said conduit discharges, a steam-engine communicating with said conduit through the reducing valve, a water-forcing pump operated by said engine and discharging into said tank to force water therethrough into the cooker-chamber by way of said pipe, a valved steam-pipe discharging into said coil for heating the water in passing through said tank, and a thermostat in said tank connected with the steam-pipe valve to control the passage of steam therethrough.

CHARLES B. TRESCOTT.